(12) United States Patent
Guidi et al.

(10) Patent No.: US 9,610,692 B2
(45) Date of Patent: Apr. 4, 2017

(54) GRIPPING HEAD FOR GROUPS OF PRODUCTS

(71) Applicant: Elettric 80 S.p.A., Viano (Reggio Emilia) (IT)

(72) Inventors: Roberto Guidi, Sala Baganza (IT); Franco Manzini, Sassuolo (IT)

(73) Assignee: ELETTRIC 80 S.P.A., Viano (Reggio Emilia) (IT)

( * ) Notice: Subject to any disclaimer, the term of this patent is extended or adjusted under 35 U.S.C. 154(b) by 0 days.

(21) Appl. No.: 14/424,878

(22) PCT Filed: Oct. 31, 2013

(86) PCT No.: PCT/IB2013/059817
§ 371 (c)(1),
(2) Date: Feb. 27, 2015

(87) PCT Pub. No.: WO2014/068513
PCT Pub. Date: May 8, 2014

(65) Prior Publication Data
US 2015/0246444 A1 Sep. 3, 2015

(30) Foreign Application Priority Data
Oct. 31, 2012 (IT) .............................. VR2012A0217

(51) Int. Cl.
*A47B 97/00* (2006.01)
*B66C 1/02* (2006.01)
(Continued)

(52) U.S. Cl.
CPC ........... *B25J 15/0014* (2013.01); *B25J 11/00* (2013.01); *B65G 57/24* (2013.01); *B65G 61/00* (2013.01)

(58) Field of Classification Search
CPC ........ B65B 5/068; B65G 57/06; B65G 57/00; B65G 57/035; B65G 57/24; B65G 61/00; B25J 15/0014; B25J 11/00
(Continued)

(56) References Cited

U.S. PATENT DOCUMENTS 6,402,455 B1 * 6/2002 Vincent ................ B65G 57/005
271/91
7,802,959 B2 * 9/2010 Pierson ................ B65G 47/086
414/789.5

(Continued)

FOREIGN PATENT DOCUMENTS

| EP | 2 508 452 | 10/2012 |
|----|-----------|---------|
| GB | 2 066 201 | 7/1981 |

OTHER PUBLICATIONS

International Search Report dated May 6, 2014 for International Application No. PCT/IB2013/059817.

*Primary Examiner* — Stephen Vu
(74) *Attorney, Agent, or Firm* — Tutunjian & Bitetto, P.C.

(57) ABSTRACT

A gripping head for groups of products including a central support, connectable to a robotic arm, and at least two gripping elements associated with the central support from opposite sides. The at least two gripping elements are mobile along a predetermined direction A, at least from respective open positions to respective closed positions in which they are suitable for lifting the group of products. Each of said gripping elements is configured to move the group of products forward along the predetermined direction A, and includes a respective opening suitable for allowing the group of products to pass along said predetermined direction A.

21 Claims, 9 Drawing Sheets

(51) Int. Cl.
  *B25J 15/00* (2006.01)
  *B65G 57/24* (2006.01)
  *B65G 61/00* (2006.01)
  *B25J 11/00* (2006.01)

(58) Field of Classification Search
  USPC ....... 414/792.7, 793.4, 794.2–794.3; 294/65, 294/115
  See application file for complete search history.

(56) References Cited

U.S. PATENT DOCUMENTS

| | | | |
|---|---|---|---|
| 2009/0087295 A1* | 4/2009 | Fritzsche | B65G 57/06 414/790.2 |
| 2011/0076126 A1 | 3/2011 | Pierson et al. | |
| 2011/0076128 A1 | 3/2011 | Johnsen et al. | |

* cited by examiner

GRIPPING HEAD FOR GROUPS OF PRODUCTS

TECHNICAL FIELD OF THE INVENTION

The present invention concerns a gripping head for groups of products.

More in particular, the present invention concerns a gripping head that is suitable for manipulating groups of products of various nature that are intended to form layers on support means such as pallets and the like, to then be sent to storing areas or points of sales.

DESCRIPTION OF RELATED ART

In various production fields such as the paper sector, also known as the "tissue" sector, or the sector of bottled products, so called "beverage" sector, but also in other sectors, products or multi packages of products are arranged on support means such as pallets and the like, for storage, stowage and/or transportation.

In some cases, moreover, the packages of products are directly put on sale on the same pallets, as often occurs, for example, in the already mentioned "beverage" field.

In the product production and packaging lines, whichever nature they may be, the packages or packs are transported, for example on roller means, to collection areas in which they are arranged in an orderly fashion alongside one another so as to form groups, having set sizes in relation to the stowing and transportation requirements.

Such groups are then taken one at a time and are subsequently arranged in layers on top of one another on a pallet or the like. The finished pallet, thus obtained, is later stored or transported to the points of sales.

The taking of the groups of packages and their subsequent deposit on the pallet are usually carried out, in the production plants of the known type, by palletizing robots, anthropomorphic robots or also robots of another type, that are provided with a gripping head that is suitable for grasping the groups of products to then arrange them in layers on top of one another on the pallet.

Various types of gripping heads are known that carry out the manipulation of the aforementioned groups of products.

Some types of gripping heads comprise a central support, that can be connected for example to a robotic arm, to which two opposite gripping elements are associated and are mobile to move towards one another so as to lock the group of products and then transport it to the desired position.

For example, some of the aforementioned gripping heads of the known type have the gripping elements provided with surfaces for supporting the products that are suitable for being inserted below the groups of products themselves so as to take them, and then position them on top of one another at the desired area.

In order to facilitate the insertion of the support surfaces below the group of products to be taken, the aforementioned surfaces are, at the respective ends, provided with a motorised roller, coated with a material having high friction coefficient, for example rubber; by giving a certain rotation to the roller, the latter clears the products of the group to be taken away from the lower layer, making it possible to insert the support surfaces below them.

This type of gripping head has the limitation of being effective in carrying out the depalletizing function, i.e. taking groups of products already in layers, but it is not as effective at carrying out the operation of forming the layers, which is obviously just as important.

Indeed the presence of gripping elements with support surfaces makes it necessary for them to be inserted below the group of products to be taken from the transportation line, and the subsequent positioning on the pallet, in successive layers.

This operative modality determines times for carrying out the operations that are quite long; such operative times become even longer in the case in which products that are particularly heavy or positioned on layers at a great height are manipulated.

Indeed, in cases like these, the sliding friction between the support surfaces and the lower surfaces of the groups of products can determine instability or wrong positioning of the products themselves: in order to avoid these phenomena, the carrying out speed of the various operative steps must be suitably reduced, thus determining however a consequent reduction in the productive rate.

SUMMARY OF THE INVENTION

The technical task of the present invention is therefore that of improving the state of the art, by devising a gripping head for groups of products that makes it possible to eliminate the drawbacks mentioned above.

In such a technical task, one purpose of the present invention is to make a gripping head that makes it possible to carry out both the palletizing and the depalletizing of groups of products in a safe and reliable manner, or rather without the risk of damaging products and/or their packages, or without the risk of positioning the products themselves in a wrong way in the areas for storing, depositing, and the like.

Another purpose of the present invention is that of devising a gripping head that makes it possible to palletize and depalletize groups of products with operative speeds that are faster with respect to those of devices of the known type.

Such a technical task and such a purpose are achieved with a gripping head according to the present principles.

A gripping head according to the invention comprises a central support, that can be connected to a robotic palletizing arm and the like, and at least two gripping elements that are associated to the central support on opposite sides, and that are mobile along a predetermined direction at least from respective open positions to respective closed positions in which they are suitable for lifting the group of products.

Each of said gripping elements comprises means for moving the group of products forward along the aforementioned predetermined direction.

Moreover, each of the gripping elements comprises a respective opening that is suitable for allowing the group of products to pass along the aforementioned predetermined direction, pulled by the forward movement means.

The dependent claims refer to preferred and advantageous embodiments of the invention.

In particular, in one embodiment, the aforementioned forward movement means of each of the gripping elements comprises a plurality of rollers that are rotatably supported in the gripping element itself with axes that are perpendicular to the predetermined direction, and respective actuation means.

In another embodiment, the gripping head also comprises compaction means that are associated with the central support and are mobile at least from respective open positions to respective compaction positions in which they enclose the group of products so as to obtain an optimal orderly configuration.

Also a method is proposed for taking a group of products from a picking up area and for depositing the group in an unloading area, which can be actuated with the gripping head according to the present principles.

BRIEF DESCRIPTION OF THE DRAWINGS

The characteristics of the invention shall become clearer to a man skilled in the art from the following description and from the attached drawing tables, given as a non-limiting example, in which.

DETAILED DESCRIPTION OF THE INVENTION

Figure 1:
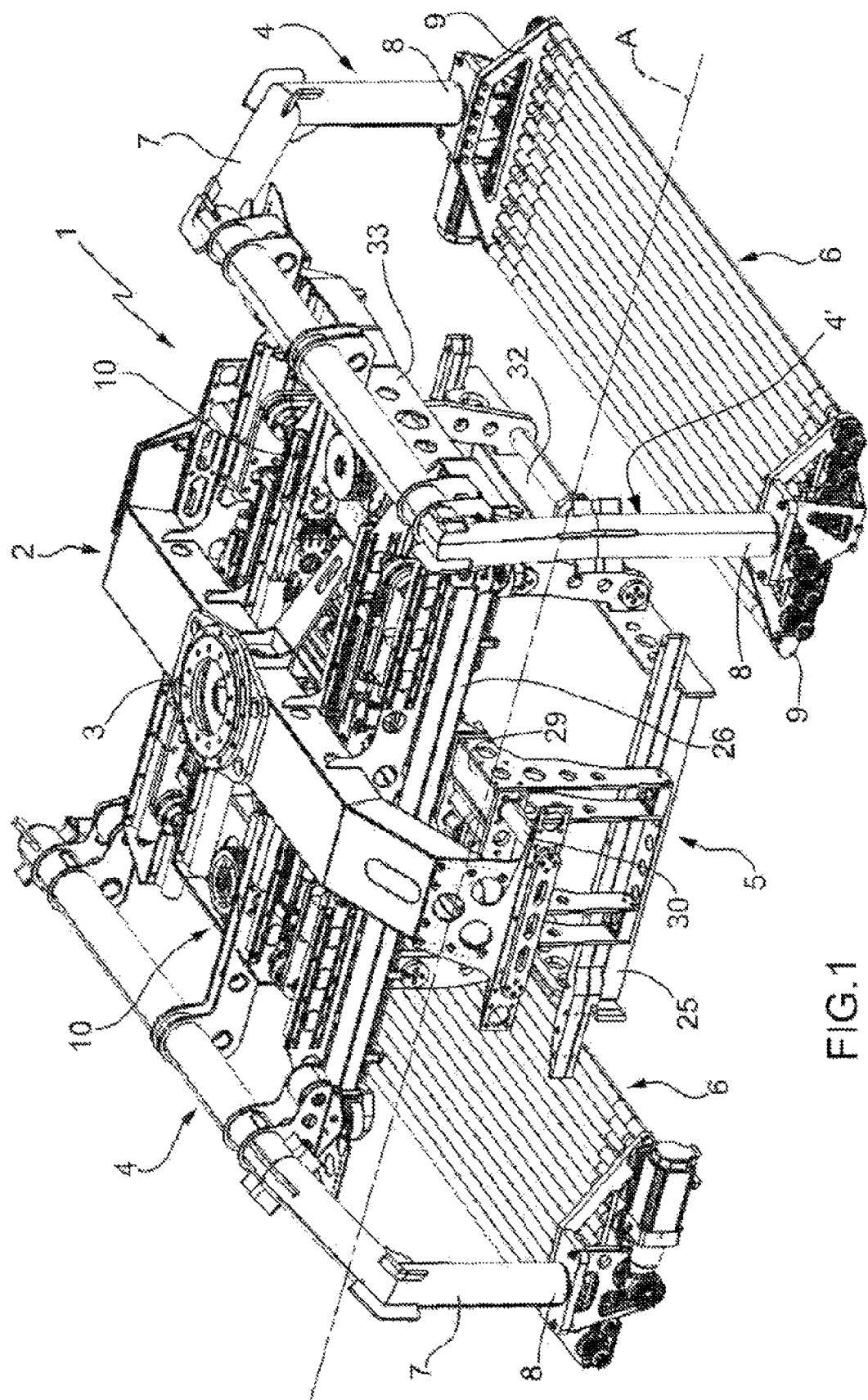
FIG. 1 is an axonometric view of the gripping head according to the present invention.
Figure 2:
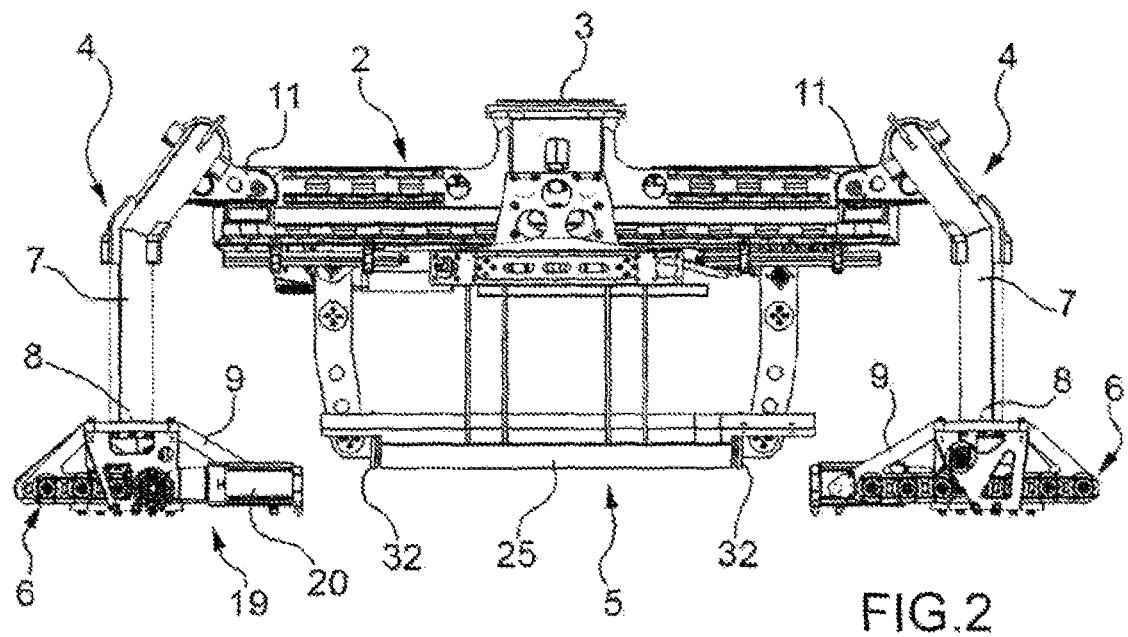
FIG. 2 is a front view of the gripping head.
Figure 3:
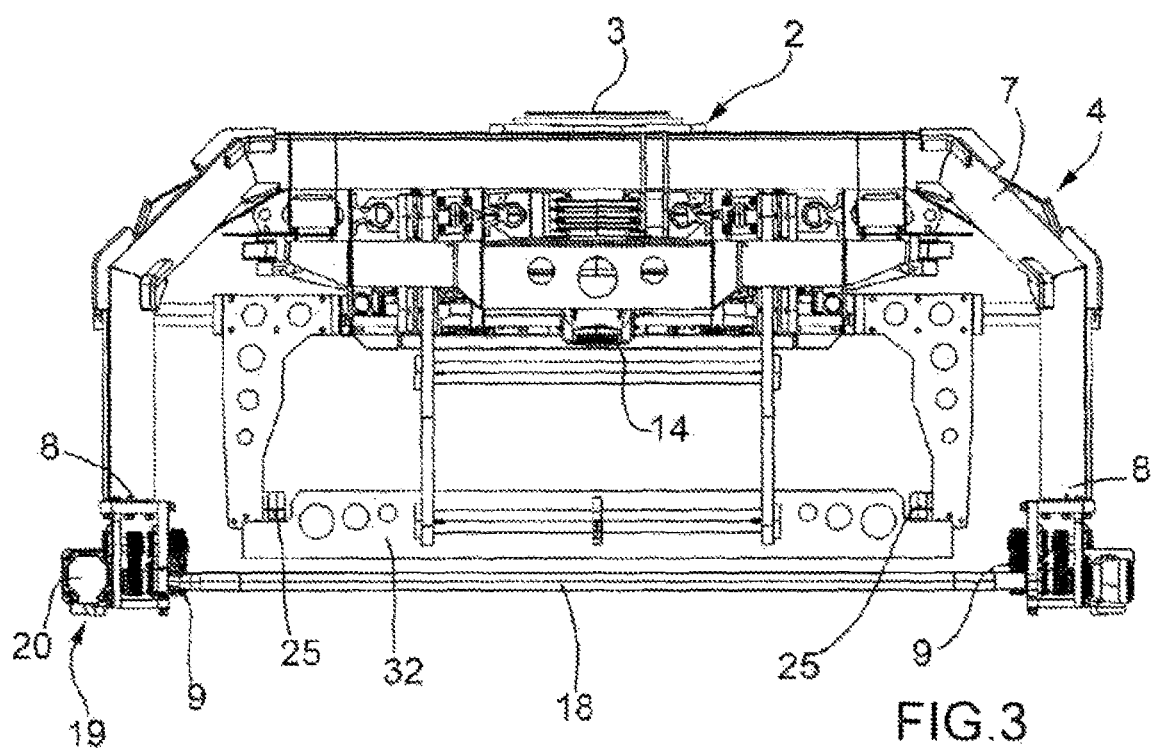
FIG. 3 is a side view of the gripping head.
Figure 4:
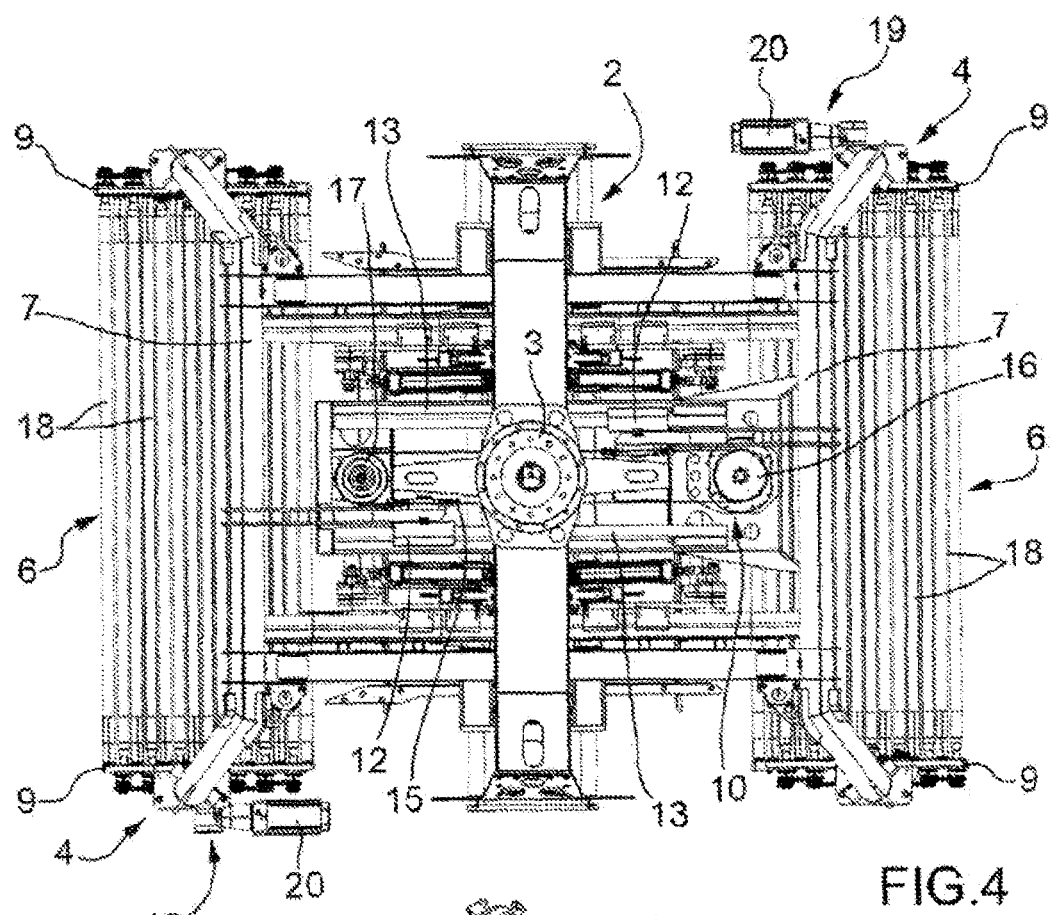
FIG. 4 is a top view of the gripping head.
Figure 5:
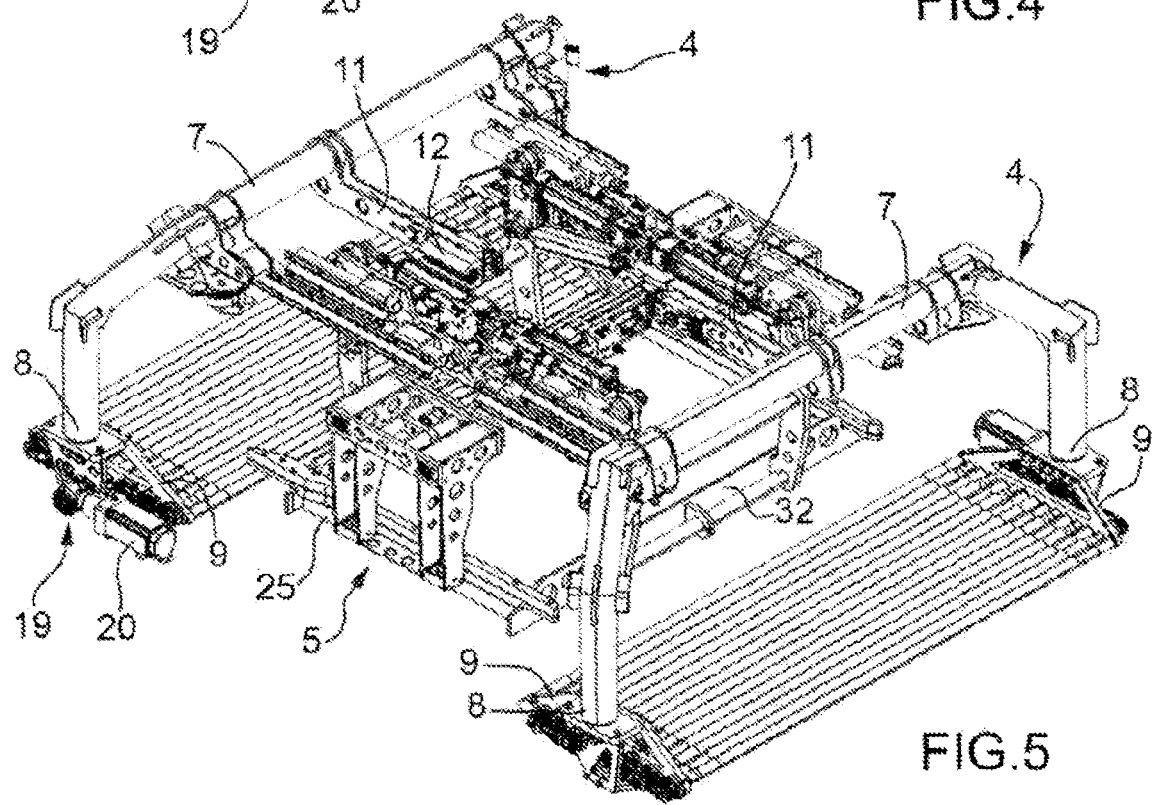
FIG. 5 is an axonometric view of the gripping head with some parts removed for the sake of clarity.
Figure 6:
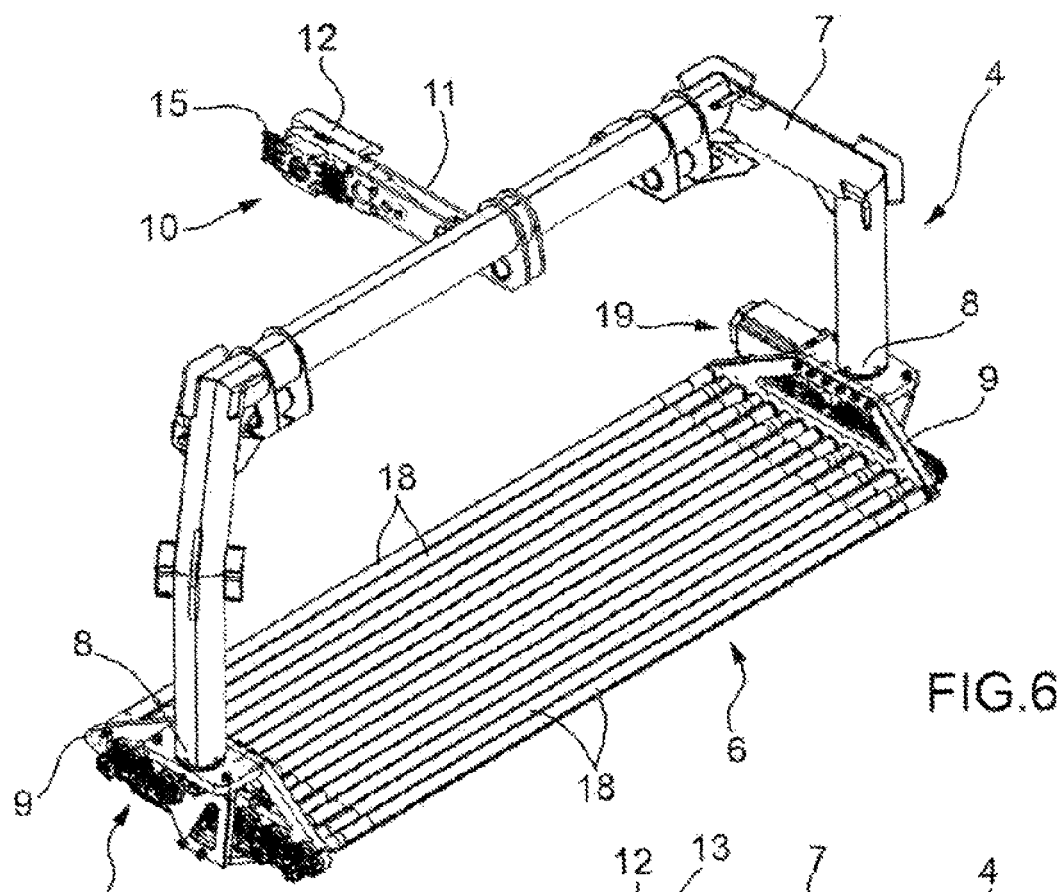
FIG. 6 is an axonometric view of a detail of one of the gripping elements of the head according to the invention.

With reference to the attached FIG. 1, reference numeral 1 wholly indicates a gripping head for groups of products according to the present invention.

The gripping head 1 described hereafter can be effectively used, for example, in any line or plant for producing and/or packaging various kinds of products.

In particular, but not exclusively, the gripping head 1 can be effectively used in production lines or plants and/or packaging lines of products in which groups of products, or groups of multiple packages of products, or the like, must be arranged in layers above one another on support means such as pallets or the like.

The arrangement in layers on the pallet and the like can be carried out, for example, in order to store and stow products, or for transporting them, or again for placing them directly on sale in the distribution points, or for any other requirement of mainly logistic nature.

In the rest of the description, by the expression group or groups of products we mean orderly group or groups of packaged products or a group or groups of orderly multiple packages of products.

For example, each group of products we refer to in the present description can consist of a group of packages of paper products such as rolls and the like, or of a group of packs of bottled products, or of a group of canned products, or again of a group of products or packages of products of any other nature, and suitable for being stored in layers on the pallet.

Moreover, by orderly group of products we mean a group of products or packages of products alongside one another, according to a set arrangement or according to set configurations, so as to optimise the relationship between the surface available and the number of products or packages of products, and to substantially define a layer of the pallet being formed.

Usually, such a set arrangement foresees making an orderly group of products that in plan view has a substantially square or rectangular bulk.

In any case, the orderly group of products can have in plan view, also a different shape.

FIG. 1 represents, in an axonometric view, the gripping head 1 according to the present invention.

Figure 12:
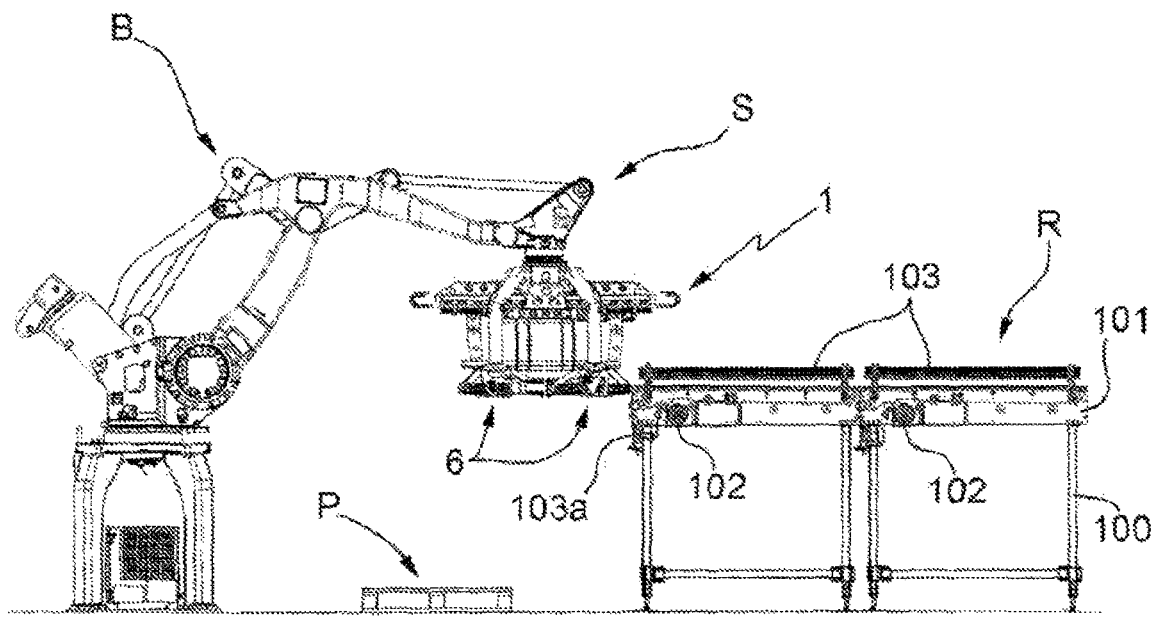
FIG. 12 is a side view of a gripping head according to the invention that is fixed to a robotic arm and to a product transportation roller mechanism.

The gripping head 1 comprises a central support 2 that can be connected to a robotic arm B of the type represented for example in FIG. 12, to which we shall refer to in the rest of the description.

The robotic arm B above can be for example of the anthropomorphic type, which is particularly suitable for carrying out palletizing operations; however, the robotic arm B can also be of another type, without any limitation.

The central support 2 is made up of a structure that develops substantially in two directions that are perpendicular to one another.

The central support 2 is provided, at the top, with a flange 3 for coupling with a robotic arm, for example through screw means of the known type and that are not represented in the figures.

Instead of the flange 3 it can be foreseen for there to be any other mechanical member that is suitable for connecting the central support 2 to a robotic arm.

The gripping head 1 comprises at least two gripping elements 4.

The gripping elements 4 are associated to the central support 2 from opposite sides.

The gripping elements 4 are mobile, along a predetermined direction A, at least from respective open positions to respective closed positions in which they are suitable for lifting the group of products, as shall be made clearer in the rest of the description.

The gripping head 1 also comprises compaction means, wholly indicated with reference numeral 5, the function of which is to compact the group of products on the gripping elements 4, thus creating an orderly group having a regular shape. The compaction means 5 shall be described in greater detail in the rest of the description.

The compaction means 5 are associated with the central support 2 of the gripping head 1, and are mobile at least from respective open positions to respective closed compaction positions, in which they enclose the group of products along their four sides so as to achieve an optimal configuration for the following operations of taking, depositing and others.

The compaction means 5 are interposed between the gripping elements 4.

It should be noted that, in other embodiments of the gripping head 1 according to the invention not represented in the figures, the compaction means 5 may not be present, since they are not necessary.

According to one aspect of the present invention, each gripping element 4 comprises respective means 6 for moving the group of products forward along the aforementioned predetermined direction A.

Such means for advancing or forward movement means 6 shall become clearer in the rest of the description, just as their operation and the consequent technical advantages shall also become clearer. At least one of the gripping elements 4 comprises a respective opening 4'.

Preferably, each of the gripping elements 4 comprises a respective opening 4'.

The opening 4' is suitable for allowing the group of products to pass along the aforementioned predetermined direction A, pulled by the forward movement means 6.

This aspect shall become clearer in the rest of the description.

More in detail, each of the gripping elements 4 comprises a respective portal structure 7, which defines the aforementioned opening 4'.

At the free ends 8 of the portal structure 7 it is foreseen for there to be respective side plates 9 to which the aforementioned forward movement means 6 can be associated.

Moreover, each of the gripping elements 4 comprises means that are wholly indicated with reference numeral 10, for translating with respect to the central support 2, along the aforementioned predetermined direction A.

The translation of the gripping elements 4 occurs with opposite directions, or rather towards or away from each other.

The translation means 10 comprise more in particular, for each gripping element 4, an appendage 11 that is fixed to the top of the portal structure 7.

The appendage 11 is provided with a shoe 12 for sliding along a guide 13 that is foreseen in the central support 2, which develops parallel to the predetermined direction A.

Figure 7:
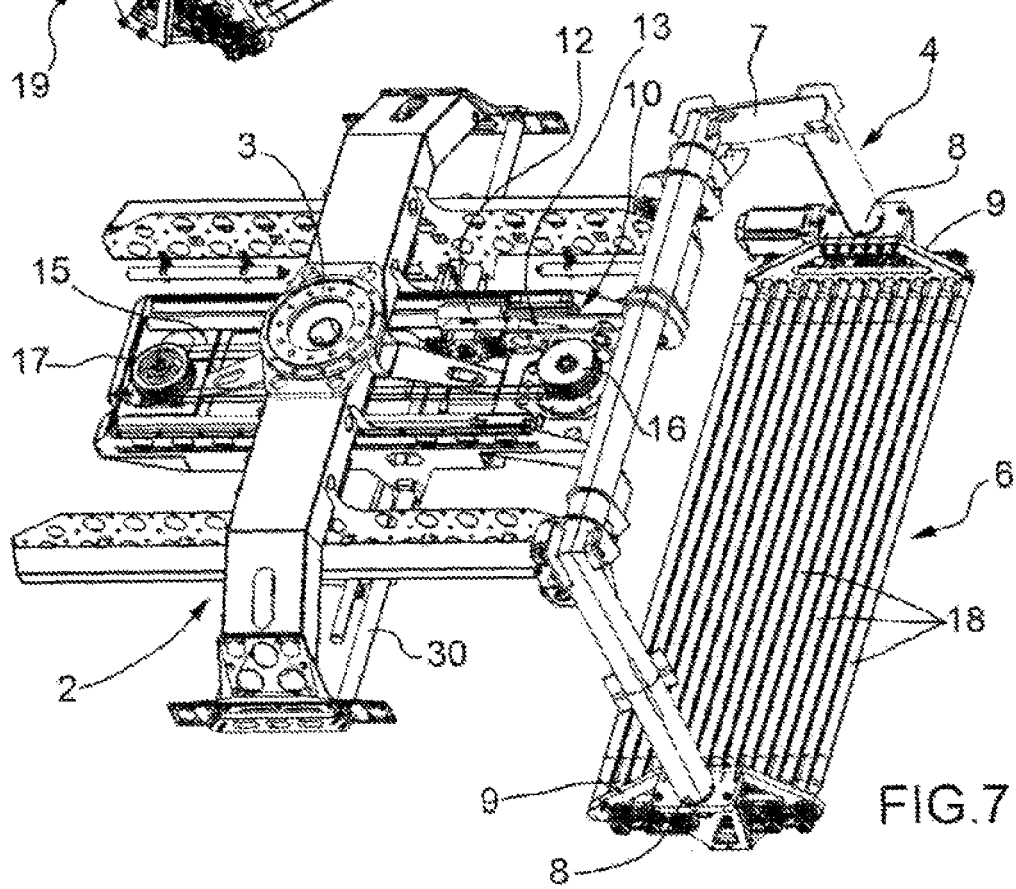
FIG. 7 is a further axonometric view of the gripping head with some parts removed for the sake of clarity.

The translation means 10 moreover comprise an upper geared motor group 14 that drives a chain 15, which is clearer in FIG. 7.

The chain 15 is closed in a loop and engages with a driving crown 16 and a driven pinion 17, that are rotatably supported in the central support 2.

The shoes 12 of both of the gripping elements 4 are in turn fixed to the chain 15.

Thanks to this solution, the rotation of the chain 15 in a certain direction causes the gripping elements 4 to move away from one another, whereas the rotation in the other direction makes the gripping element 4 themselves move towards one another.

The means for advancing or forward movement means 6 of each of the gripping elements 4 comprise, according to one aspect of the present invention, a plurality of rollers 18 that are rotatably supported in the gripping element 4 itself with axes that are perpendicular to the aforementioned predetermined direction A.

The rollers 18 are parallel to one another, positioned at a distance that is short enough as to leave only small spaces between them, so that no object, even a small one, can get stuck in them.

The rollers 18 are rotatably supported, at respective ends, in the side plates 9 of the gripping elements 4.

The forward movement means 6 moreover comprise respective actuation means 19 that are foreseen in each gripping element 4.

The actuation means 19 of the rollers 18 comprise more in detail, for each of the gripping elements 4, a geared motor 20 that is supported by the gripping element 4 itself and belt transmission means 21 that connect the geared motor 20 to the rollers 18.

Figure 9:
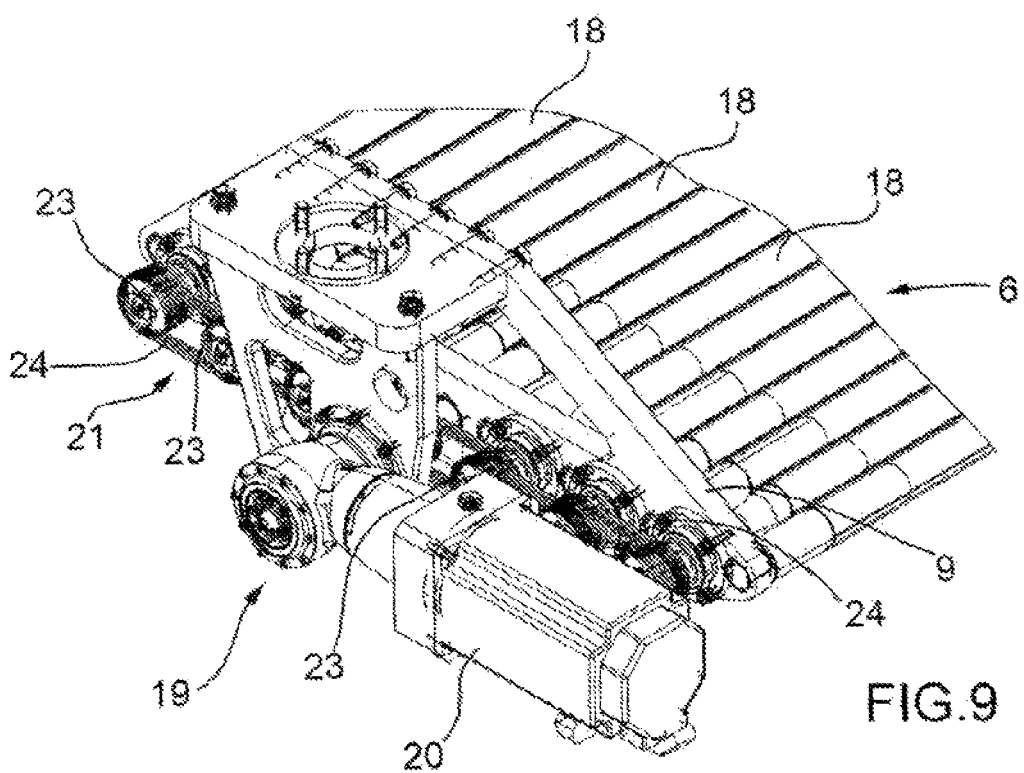
FIG. 9 is an axonometric view of a detail of the actuation means of the rollers of one of the gripping element of the head.
Figure 10:
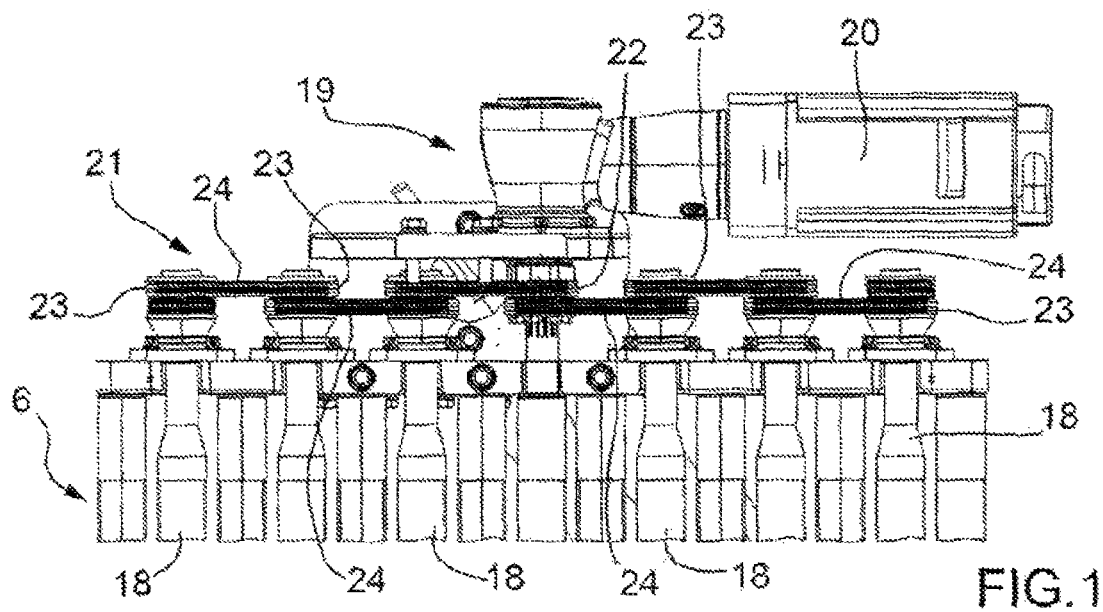
FIG. 10 is a view from below of a detail of the actuation means of the rollers of one of the gripping elements of the head.

As visible in particular in FIGS. 9, 10, the belt transmission means 21 comprise a driving pulley 22 that is connected to an outlet shaft of the geared motor 20, a plurality of driven pulleys 23 that are each associated with a respective roller 18, and a plurality of belts 24 that connect the rollers 18 two by two.

The reciprocal connection modality between the various rollers 18 through belts 24 is illustrated in particular in FIG. 10.

In the represented embodiment, the driving pulley 22 is mounted on the outlet shaft of the geared motor 20; one of the rollers 18 is in turn connected to the driving pulley 22.

The geared motor 20 can be, for example, of the same type that is used in robotic applications, or rather it can be of the same type as that mounted on the robotic arm B that bears the gripping head 1, also made by the same manufacturer.

In such a way, the programming of the motion of the forward movement means 4 is easier and simpler, since it can be carried out at the same time as the programming of the movements of the robotic arm B.

The rollers 12 of the forward movement means 6 are made from a composite material, for example of the carbon fibre type.

As an alternative, other materials with suitable characteristics can be used without any limitation.

This solution makes it possible to have rollers 18 with optimal mechanical performance, mainly high rigidity, together with a small weight and also a minimised diameter: this is particularly advantageous in taking and/or depositing groups of products positioned also at considerable heights.

Moreover, the high rigidity of the rollers 18 together with a small diameter makes it possible to obtain a precise and regular forward movement of the groups of products, with a speed that is as even as possible.

The rollers 18 can be made with a smooth or substantially smooth outer surface.

This characteristic promotes the forward movement of the groups of products above the rollers 18 in an easy manner and without the risk of jamming or accidental movements: in other words, the smooth surface of the rollers 18 makes it possible to optimally maintain the mutual positions of the various products of the same group, also during their forward movement.

The compaction means 5 of the group of products on the surface of the forward movement means 6 comprise first opposite mobile walls 25 that are foreseen at first sides 26 of the central support 2.

Figure 8:
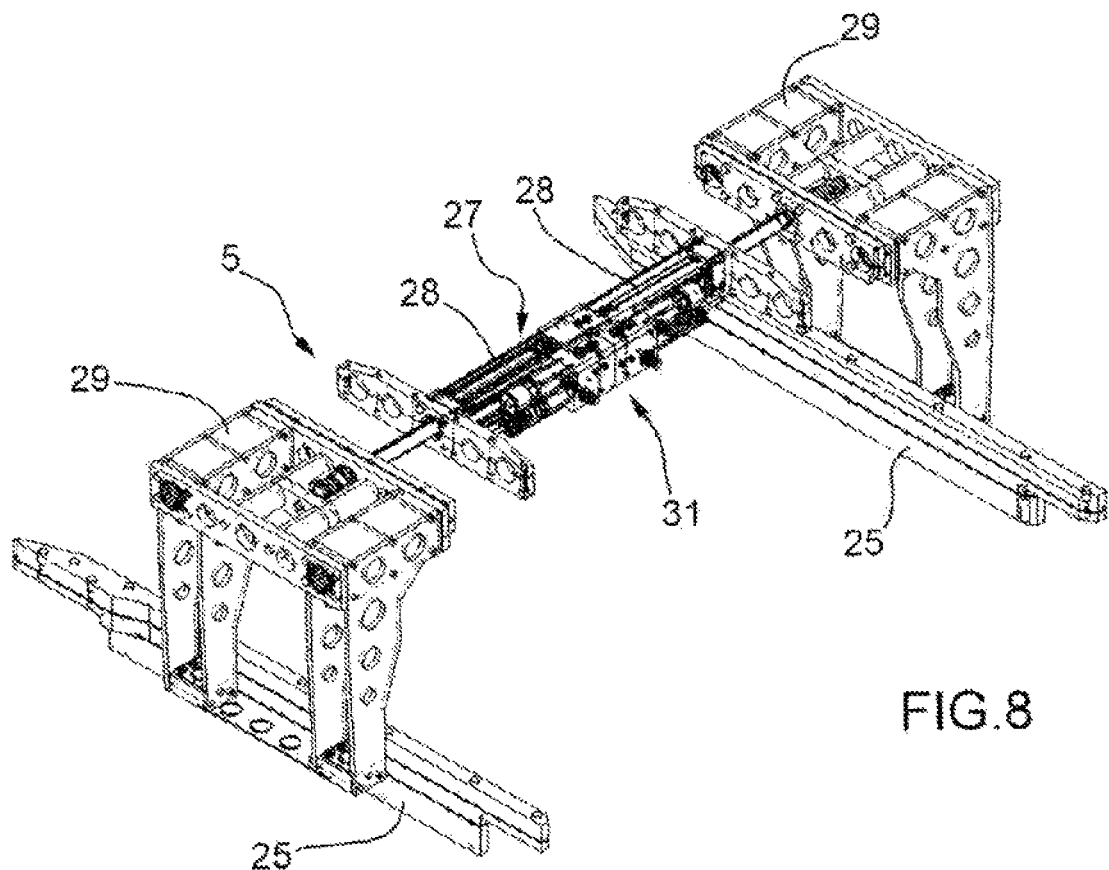
FIG. 8 is an axonometric view of a detail of the compaction means that are associated with the gripping head according to the invention.

For a better understanding, see FIG. 8.

The first mobile walls 25 are associated with respective first translating members, which are wholly indicated with reference numeral 27, along a direction that is perpendicular to the predetermined direction A.

More in detail, for each of the first mobile walls 25 the first translation members 27 comprise a respective first pneumatic actuator 28.

Each first pneumatic actuator 28 is fixed to the central support 2; the stem of each first pneumatic actuator 28 is connected to a respective first slider 29 that can slide on first guide bars 30 that are perpendicular to the aforementioned predetermined direction A and are fixed to the same central support 2.

A respective first mobile wall 25 is then connected to each first slider 29.

The first translation members 27 moreover comprise a first servo-pneumatic positioning system 31.

More in detail, the first servo-pneumatic positioning system 31 comprises, for example, an electronic controller, which is slaved to the unit for managing and controlling the operation of the robot on which the gripping head 1, of the type known in the field and not represented in the figures, is mounted. A proportional pneumatic valve of the known type is, in turn, operatively associated with the electronic controller, said valve controlling the operation of each of the first pneumatic actuators 28.

The system can moreover comprise sensors, which are not represented in the figures, that detect the position of the stems of the first pneumatic actuators, as well as pressure sensors for detecting the force exerted, and that are part of a control system in feedback, or the like.

The first servo-pneumatic positioning system 31 makes it possible to precisely control the movement over time, and therefore the final position of each of the first mobile walls 25.

Moreover, the first servo-pneumatic positioning system 31 makes it possible to precisely control the force exerted by each first pneumatic actuator 28 on the group of products.

The compaction means 5 also comprise second opposite mobile walls 32 foreseen at second sides 33 of the central support 2.

Figure 11:
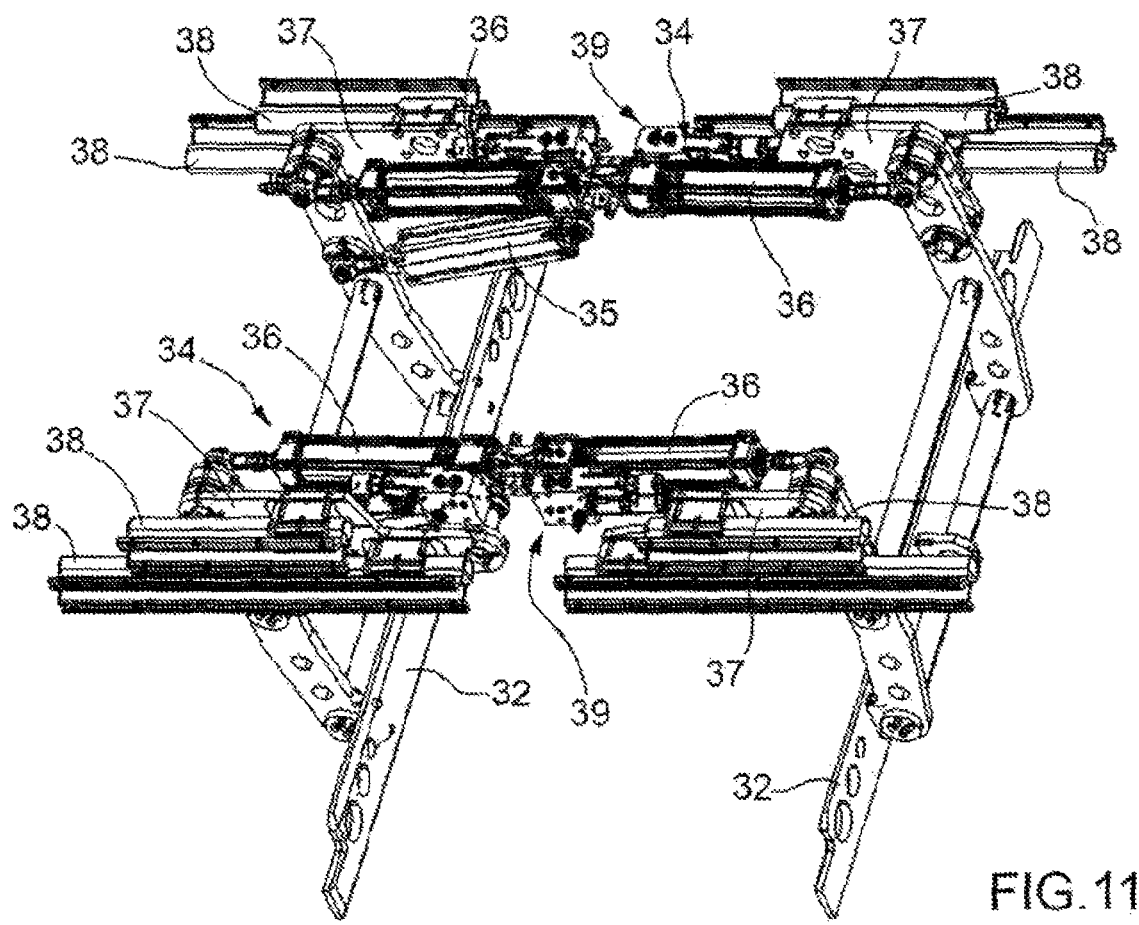
FIG. 11 is another axonometric view of a detail of the compaction means that are associated with the gripping head according to the invention.

For a better understanding, see now FIG. 11.

The second mobile walls 32 are associated with respective second members, wholly indicated with reference numeral 34, for translating along the predetermined direction A.

Moreover, the second mobile walls 32 are associated with means 35 for rotating around respective axes that are parallel with respect to the second sides 33, the function of which shall become clearer in the rest of the description.

The second translation members 34, for each of the second mobile walls 32, comprise a respective second pneumatic actuator 36.

Each second pneumatic actuator 36 is fixed to the central support 2; the stem of each second pneumatic actuator 36 is connected to a respective second slider 37 that is able to slide on second guide bars 38 that are parallel to the aforementioned predetermined direction A, fixed to the same central support 2.

A respective second mobile wall 32 is then connected to each second slider 37.

The second translation members 34 also comprise a respective second servo-pneumatic positioning system 39.

The second servo-pneumatic positioning system 39 is completely the same as the first servo-pneumatic positioning system 31 of the first translation members 27, and has the same function, therefore it shall not be described any further.

The rotation means 35 of the second mobile walls 32, for each of the aforementioned second walls 32, comprise a third pneumatic actuator that is hinged to the second mobile wall 32 and to the central support 2.

The rotation means 35 make it possible, when necessary, to lift the second mobile walls 32 so as to allow a group of products to pass, as shall be described in greater detail in the rest of the description.

One object of the present invention is also a gripping station for groups of products, wholly indicated with S in FIG. 12, comprising a robotic arm B, a gripping head 1—of the type illustrated in the present description—that is fixed to the robotic arm B, a roller mechanism R defining, in a terminal region thereof, a picking up area of the groups of products, and an unloading area, consisting for example of a pallet P or of other equivalent elements.

Hereafter we shall briefly describe a method for taking a group of products, by the gripping head 1 according to the invention, from a picking up area and for subsequently depositing the group itself in an unloading area: such a method is also object of the present invention.

By picking up area we mean in general any area of a production line and/or packaging line in which an already formed and orderly group of products to be taken and then deposited in another area.

Preferably, for the purposes of the present invention, the picking up area can advantageously consist of the terminal part of a device for transporting the group of products, for example a roller mechanism R like in the embodiment of FIG. 12, a belt or the like.

By unloading area, on the other hand, we mean any area of a production line and/or packaging line in which the aforementioned group of products must be deposited by the gripping head 1.

Preferably, for the purposes of the present invention, the unloading area can advantageously consist of the resting surface of a pallet P—like in the embodiment of FIG. 12—on which it is necessary to make layers of products, or it can consist of another group of products that has already been deposited on the pallet itself, so as to make a multilayer stack.

The roller mechanism R is of the type that is substantially known in the field.

More in detail it comprises a frame 100 on which side panels 101 are mounted; the side panels 101 rotatably support rollers that are actuated by motors 102.

It is also foreseen for there to be upper panels 103.

The roller mechanism R also comprises a front panel 103a that is mobile from a raised position for the abutment of the products to a lowered position of free passage of the products themselves.

The motors 102 for actuating the roller mechanism R could advantageously be of the same type used both in the robotic arm B and in the gripping head 1, so as to considerably simplify the integrated control of the functionality of the entire system according to the desired parameters.

The method object of the present invention initially comprises a step for translating the gripping elements 4 of the head 1 into the respective closed positions, in which the forward movement means 6 of the two gripping elements 4 are in contact with one another.

It is then foreseen for there to be a step of moving the gripping head 1 towards the picking up area.

The step of moving the head 1 closer is carried out through suitable command of the robotic arm B.

In preferred embodiments of the invention this step consists, in particular, in moving the gripping head 1 towards the terminal part of a device for transporting the group of products, for example a roller mechanism, a belt or the like.

In particular, in the embodiment illustrated in FIG. 12, the gripping head 1 is moved towards the terminal region of the roller mechanism R, that indeed comprises the picking up area.

By doing this, the forward movement means 6 of one of the gripping elements 4 constitute, with the aforementioned terminal region of the roller mechanism R, a substantially continuous surface on which the group of products can move forward through the opening 4' of the gripping element 4 closest to the roller mechanism R without obstacles or discontinuity.

In the case in which the compaction means 5 are present in the head 1, it is in this case foreseen for there to be a step for lifting the second mobile walls 32 so as to free the passage below the portal structure 7 of the gripping element 4 that is immediately closest to the transportation device.

There is then a step of actuating the forward movement means 6 so as to transfer the group of products from the picking up area of the roller mechanism R to the forward movement means 6 themselves, through the opening 4' of the gripping element 4 closest to the roller R.

More in detail, this step consists of actuating the forward movement means 6 so that the group of products that moves on the roller mechanism R, continues its movement without interruption, passes through the opening 4' of the gripping element 4 closest to the roller mechanism R and is deposited on the forward movement means 6.

The forward movement means 6 can be actuated, for example, with decreasing speed that becomes zero when the group of products is substantially at the centre of the gripping head 1.

In other words, the movement of the group of products coming from the transportation device is continued by the forward movement means 6, which then provide for stopping the group itself at the centre of the head 1.

This means, in particular, that the rollers 18 of both the gripping elements 4 are actuated to rotate, all in the same direction, with a speed that decreases so as to stop the group of products in the desired position.

This operation can be obtained thanks to the extreme precision with which the motion of the rollers 18 can be controlled.

It is also worth noting that the transfer of every group of products from the roller mechanism R to the gripping head 1 occurs easily without the help of any kind of pushers or translators.

In the case in which the compaction means 5 are present in the head 1, it is then foreseen for there to be a step of compaction of the group of products on the forward movement means 6.

Such a step is of course carried out by means of the aforementioned compaction means 5, by acting in particular on the first mobile walls 25 and on the second mobile walls 32 in a controlled and servo-assisted manner so as to obtain an optimal configuration of the products in a same group.

More in detail, when carrying out this operation, both the position of the mobile walls 25, 32 and the force exerted by these on the group of products are checked, instant by instant, so as to not damage them or accidentally move them from the optimal position.

At the end of this step, the group of products is positioned on the forward movement means 6 and is held tightly by the compaction means 5, which in addition to carrying out the aforementioned compaction operation of the products also provide for keeping the group itself in the correct position during the subsequent movements of the gripping head 1, preventing accidental movements from occurring.

On the other hand, in the case in which the gripping head 1 is without compaction means, the compaction of the products belonging to a same group can also be effectively carried out by the same forward movement means 6.

EXAMPLE 1

Figures 13, 14:
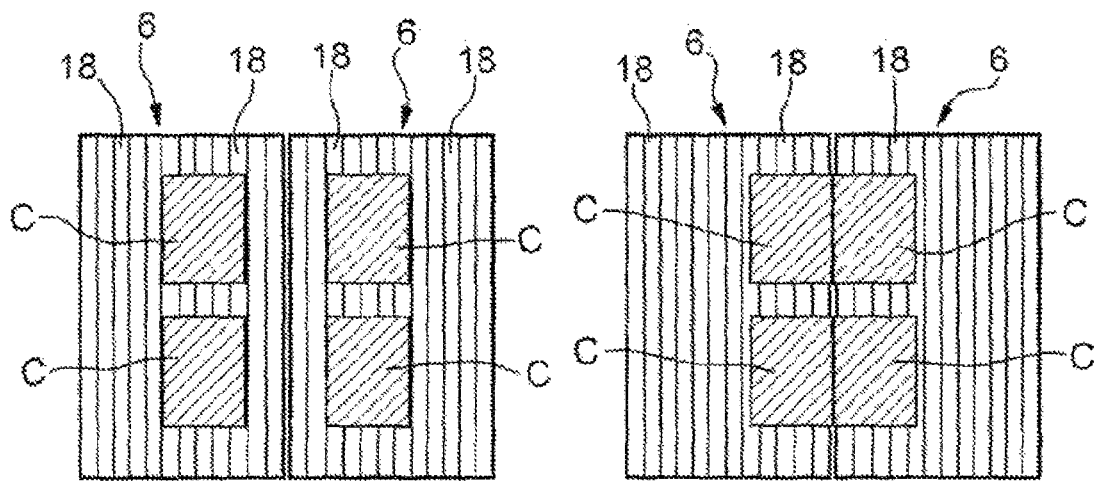
FIG. 13 is a schematic view from above of a gripping head according to the invention, in a first embodiment, on which there is a group of products that has not been compacted.
FIG. 14 is a schematic view from above of the gripping head of FIG. 13, in which the products have been compacted inwards with respect to the gripping head.

We shall indeed refer, for this particular situation to FIGS. 13, 14.

FIG. 13 represents a schematic plan view, from above of a gripping head 1 in which the products C have been transferred from the terminal region of the roller mechanism R to the forward movement means 6—i.e. the rollers 18—of the head 1 itself.

The products C reach the roller mechanism R—and are thus then transferred onto the head 1 not compacted (FIG. 13), in this first step the rollers of the roller mechanism R and of the head 1 rotate at the same speed substantially in synchrony.

Once they have been transferred onto the head 1 and when the products C are approximately at the centre of the head, the products C are then compacted along the direction A by the same forward movement means 6 as illustrated in FIG. 14, which is a schematic plan view of the head 1 itself.

In particular, the compaction of the products C in the manner illustrated in FIG. 14 can be carried out by making the rollers 18 of the two gripping elements 4 rotate according to opposite directions, so as to induce all the products C to translate towards the centreline of the head 1.

The movement of the products C towards one another, until they are all in contact with one another is thus obtained rapidly.

The smooth surface of the rollers 18 makes it possible to obtain also small possible sliding between the rollers 18 themselves and the lower surfaces of the products C, without damage: this makes it possible for the products C to be moved towards one another also in the case in which they are initially at different distances, in a random way, with respect to the centreline of the gripping head 1.

In other words, the rollers 18 are suitably kept in rotation until all the products C are in the final desired position, i.e. perfectly in contact with one another according to selected compaction modalities. The possible sliding that can occur between the rollers 18 and the products C already positioned correctly—and therefore stationary—does not in any case cause any damage to the products C themselves.

This operation is made particularly easy thanks to the fact that the rotation speed of the rollers 18 can be controlled with optimal precision and sensitivity, in each instant of the compaction step of the products C.

There is then a step of lifting the gripping head 1, by the robotic arm B to which it is connected, with respect to the roller mechanism R.

After this, it is foreseen for there to be a step of positioning the gripping head 1, bearing the group of products C, above the unloading area.

As mentioned, the unloading area can be any area in which it is necessary to deposit the group of products: for example, the unloading area can consist of a pallet P, as illustrated in FIG. 12, or also of another group of products C that has already been positioned on a pallet P.

At this stage, in the case in which the compaction means 5 are present in the head 1, it is foreseen for there to be a step of opening the compaction means 5—i.e. of the first mobile walls 25 and of the second mobile walls 32—so as to free the group of products.

Subsequently, it is foreseen for there to be a step of translating the gripping elements 4 into their respective open positions: in such a way, the group of products C can be deposited in the unloading area, by falling.

Of course, in order to not jeopardise the correct position with respect to one another of the products C in the same group, the fall of the products C themselves in the unloading area must be at most of a few centimetres: in order to obtain this, the positioning of the gripping head 1 at the unloading area must be very precise.

The opening of the gripping elements 4 can be carried out by giving a rotation to the forward movement means 6—in this case the rollers 18—with a certain speed, function of the opening speed of the gripping elements 4, in a way such as to keep the products C compact, or rather in a way such as to prevent them from moving with respect to one another during the opening of the gripping elements 4.

As an alternative, if necessary, the step of opening the compaction means 5—if present—can be carried out after the step of translating the gripping elements 4 in their respective open positions, so as to keep the products in the correct position until they fall in the unloading area.

In the case in which the gripping head 1 is used to make various layers of products on a pallet P, the method described repeats itself, of course, for a number of cycles corresponding to the number of layers to be obtained on the pallet P itself.

EXAMPLE 2

This other embodiment refers in particular to FIGS. 15-19.

It is worth underlining that in this embodiment we assume that, in the head 1, there are compaction means 5.

Figure 15:
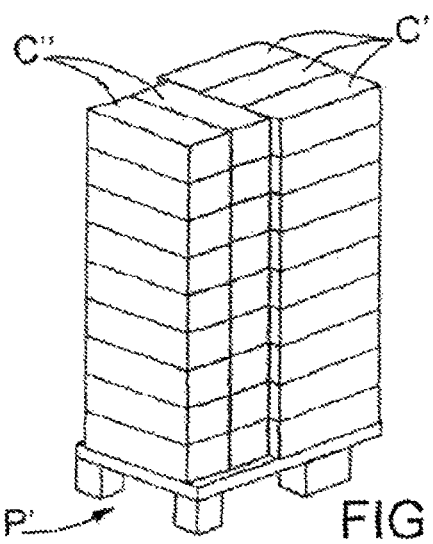
FIG. 15 is an axonometric view of an unloading area with groups of layered products, in a second embodiment.

FIG. 15 illustrates the final result that is desired to be obtained in this embodiment, i.e. a quarter of a pallet P'—with standard dimensions—with a series of layers of products C', C" that are arranged according to the illustrated modality.

This, in particular, is a modality of layering that is widely used for placing the products C', C" directly on sale in supermarkets or other points of sales.

More in detail, every layer comprises three products C' with predetermined dimensions—for example boxes of tins, or similar—alongside one another along the respective long sides and arranged transversely with respect to the head 1, and two further products C", again alongside one another along the long sides but rotated by 90° with respect to the other three products C', and therefore arranged longitudinally with respect to the same head 1.

Figure 16:
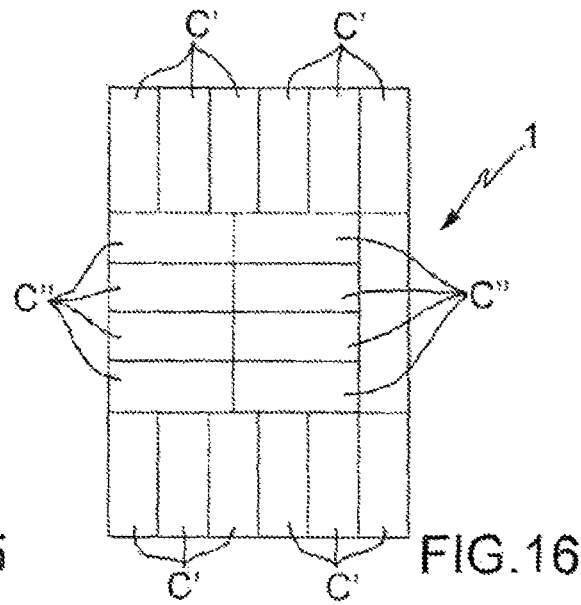
FIGS. 16, 17, 18 are respective plan views of the gripping head in successive operative steps, in the aforementioned second embodiment.

FIG. 16 illustrates a schematic plan view of the arrangement of the products C', C" at the terminal region of the roller mechanism R.

As can be observed, the products C', C" have an aligned arrangement at the terminal region of the roller mechanism R, thanks to the presence of the front panel 103a, that stops the forward movement of the products C', C" themselves.

Following the lowering of the front panel 103a, the products C', C" are transferred, keeping the same illustrated arrangement, from the terminal region of the roller mechanism R to the forward movement means 6—i.e. the rollers 18—of the head 1.

At this stage, two different operative modalities are possible.

Figure 17:
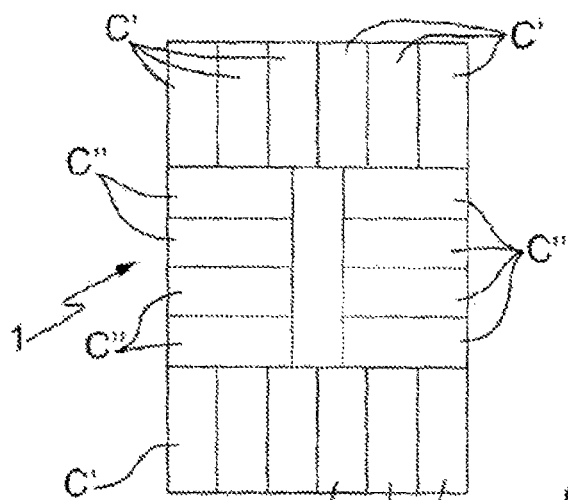

With reference now to FIG. 17, according to a first operative modality the rollers 18 of the gripping element 4 on the right—i.e. at the long side at which the products C', C" are not aligned—are actuated with a suitable speed, so as to make the four products C" arranged longitudinally and positioned further right, to translate towards the right side of the head 1. The configuration of the products C', C" following the aforementioned translation is indeed illustrated in FIG. 17, which represents a schematic plan view of the head 1.

The translated products C" are thus rested on the second mobile wall of the compaction means 5 which is on the right.

The products C', arranged transversally, do not move since they are already resting on the aforementioned second mobile wall 32.

Subsequently, the rollers 18 of both the gripping elements 4 of the head 1 are set in rotation, with opposite directions, so as to make all the products C"—i.e. both those aligned on the left, and those aligned on the right—to translate towards the centreline of the head 1 itself.

Figure 18:
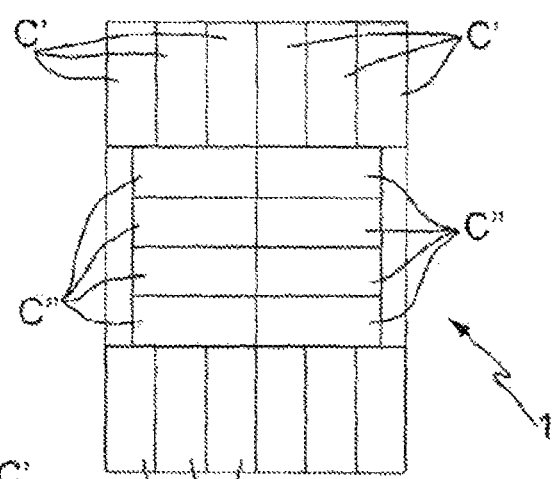

At the end of such a translation, the products C" abut against one another at the centre of the head 1. This situation is represented in FIG. 18.

In the meantime, the head 1 is moved, by the robotic arm 32, above the unloading area, which as mentioned consists of a quarter of the pallet P'.

In order to obtain the configuration suitable for the stratification represented in FIG. 15, at this stage the gripping elements 4 of the head 1 are made to open, according to the following modalities.

For one first translation section of the gripping elements 4, corresponding to the distance D that each of the two groups of products C" must travel outwards so as to be positioned correctly, the rollers 18 of both the gripping elements 4 are kept blocked: in such a way, the two groups of products C" are pulled—through friction between the rollers 18 and the bases of the products C" themselves—towards the outside for the same desired distance D, hypothesizing the same friction conditions.

After this, the rollers 18 of both the gripping elements 4 are set in rotation, according to directions that are opposite to that of the opening of the gripping elements 4 themselves, so as to unload all the products C', C" on the quarter of pallet P' without further relative movements between the products C' C".

Figure 19:
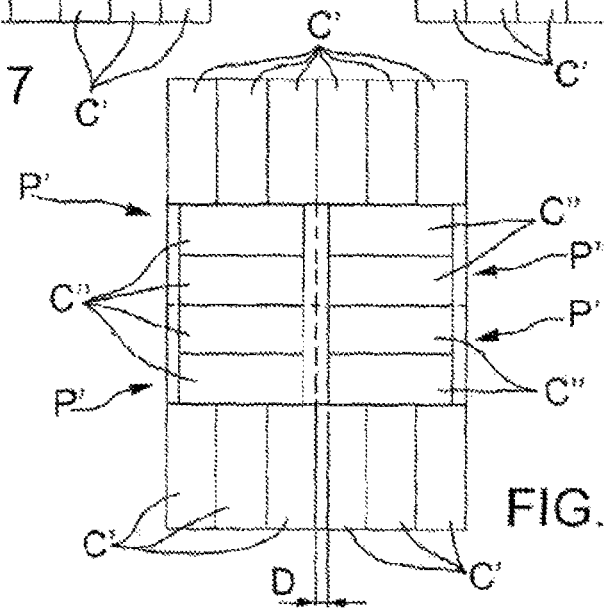
FIG. 19 is a plan view of a group of products that has been deposited in the unloading area, in the aforementioned second embodiment.

The end situation, i.e. that of the products C', C" already deposited on the quarter of pallet P', is thus illustrated then in FIG. 19.

With reference, on the other hand, to a second possible operative modality, following the transfer of the products C', C" onto the head 1, the rotation, this time in the same direction, of all the rollers 18 of the gripping elements 4 is actuated: the central products C", initially aligned on the left, are thus translated as a unit towards the right so as to directly reach the configuration that is illustrated in FIG. 18, in which the two groups of products C" are in abutment against one another at the centreline of the head 1.

It is thus possible to avoid the intermediate passage illustrated in FIG. 17, which was reached on the other hand in the first operative modality described.

In the meantime the head 1 has reached the unloading area P': the unloading of the products C'C" then occurs exactly as described in the previous operative modality.

This second modality, with respect to the first, is thus characterised in a smaller number of operative steps: the configuration of FIG. 18 must however be reached directly through a translation of the products C" as a unit which must be precisely controlled.

In the first operative modality, on the other hand, the configuration of FIG. 18 is reached starting from the intermediate configuration of FIG. 17, through simple actuation of the rollers 18 of the two gripping elements 4 according to opposite directions: in optimal conditions—hypothesizing therefore, for example, the same friction conditions—the two groups of products C" meet one another at the centreline of the head 1 with good precision.

The invention thus conceived makes it possible to achieve important technical advantages.

Firstly, the loading of the group of products C, C', C" on the head 1 from the picking up area can occur in an extremely rapid and simple manner, in particular when the picking up area is made up of a transportation device like a roller mechanism R, a belt, and the like on which the groups of products C, C', C" reach one after the other.

Indeed, the groups of products C, C', C" are transferred directly from the transportation device to the forward movement means 6 of the head 1 without interruption or further operations that could slow down the rate of production.

Moreover, the depositing of each group of products C, C', C" in the unloading area, actuated with the gripping head 1 according to the present invention, is carried out in a safer and more reliable way with respect to known gripping heads: this is particularly advantageous in the case in which the gripping head 1 is used for making, on pallets, layers of products having quite considerable heights.

Indeed, as mentioned, the depositing of groups of products C, C', C" through the opening of the gripping elements 4 carried out by giving also a certain rotation to the rollers 18 of the forward movement means 6 occurs in a safe and stable manner and without the risk of accidental movements of products that could destabilise the entire stack made on the pallet.

The presence of rollers 18 with controlled actuation also makes it possible to considerably reduce the friction that could generate, during the depositing step of the group of products C, C', C", with the surface of the underlying group that has already been deposited.

Another important technical advantage that can be obtained with the gripping head 1 according to the present invention consists in the fact that, during the movements of the head 1 actuated by the robotic arm B, the forward movement means 6 can be actuated to carry out movements for adjusting or repositioning the group of products C, C', C", in relation to the specific requirements: this makes it possible to eliminate idle time and delays that would otherwise occur if such operations were carried out with the gripping head 1 not in movement.

It is also worth underlining that the respective excursion strokes of the first mobile walls 25 and the second mobile walls 32 are adjustable, so as to deposit the products in pre-established positions.

Figure 20:
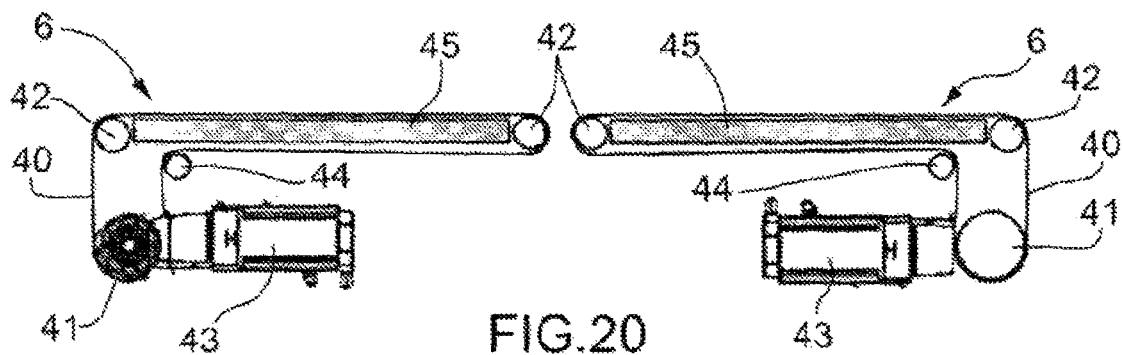
FIG. 20 is a schematic side view, with some parts that have been removed for the sake of clarity, of another embodiment of the gripping head according to the invention.
Figure 21:
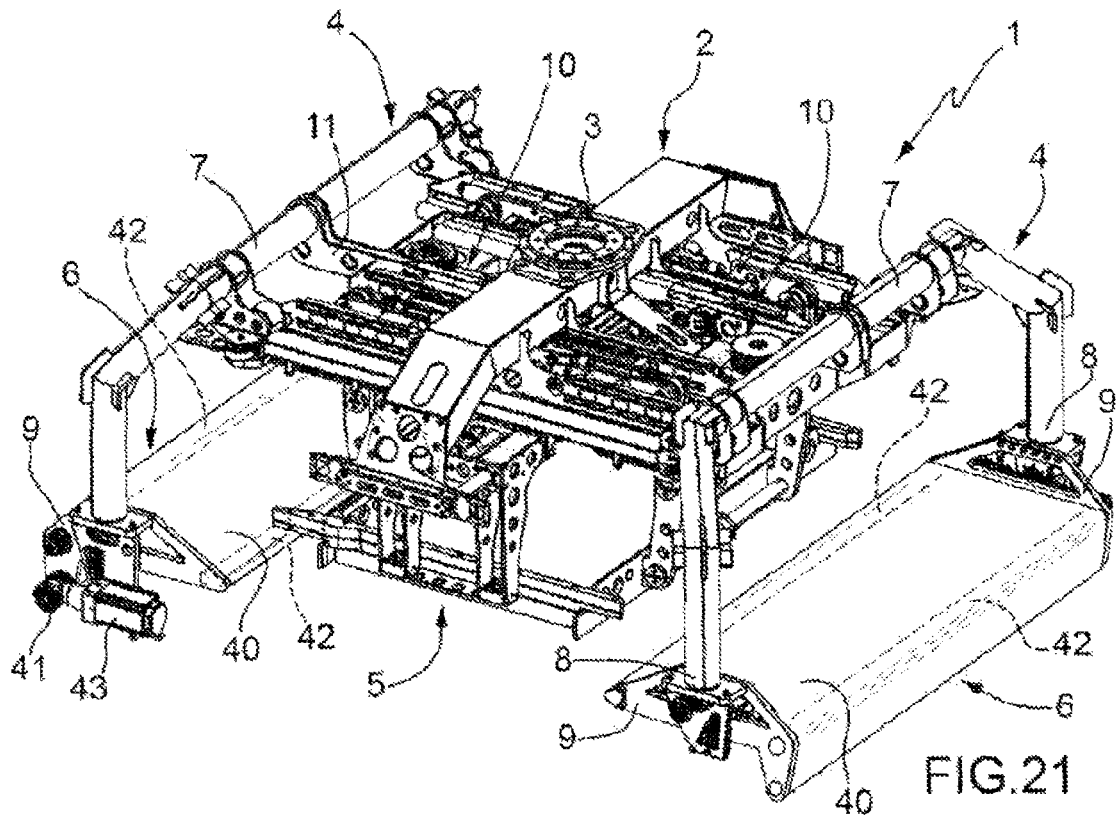
FIG. 21 is an axonometric view of the head according to the embodiment of FIG. 20.

Another embodiment of the gripping head 1 according to the present invention is illustrated in FIGS. 20, 21.

This embodiment of the gripping head 1 is identical to that of FIGS. 1-12 except for the fact that the forward movement means 6 are of a different type.

More in detail, the forward movement means 6 of each of the gripping elements 4, in this embodiment, comprise at least one belt 40 that is wound on a driving roller 41 and driven rollers 42 both rotatably supported in the gripping element 4.

More in detail, for each gripping element 4, the driving roller 41 and the driven rollers 42 are rotatably supported on side plates 9 that are connected to the portal structure 7, with axes that are perpendicular to the predetermined direction A.

The side plates 9 are suitably shaped so as to support the driven rollers 42 at the support plane of the products, and the driving roller 41 in the lower position, as illustrated in FIG. 15.

It is moreover foreseen for there to be a gear motor 43, which is coupled to the driving roller 41, of the same type as that used in the forward movement means 6 according to the previous embodiment.

The correct winding of the belt 40 according to the scheme illustrated in FIG. 15 is obtained thanks to the presence of an idler roller 44, also supported in the side plates 9.

Between the driven rollers 42 it is foreseen for there to be a stiffening plate 45 that is positioned between two branches of the belt 40.

The stiffening plate 45 is made for example from carbon fibre, and it ensures that there is the necessary rigidity and a low friction with the moving belt 40.

Figure 22:
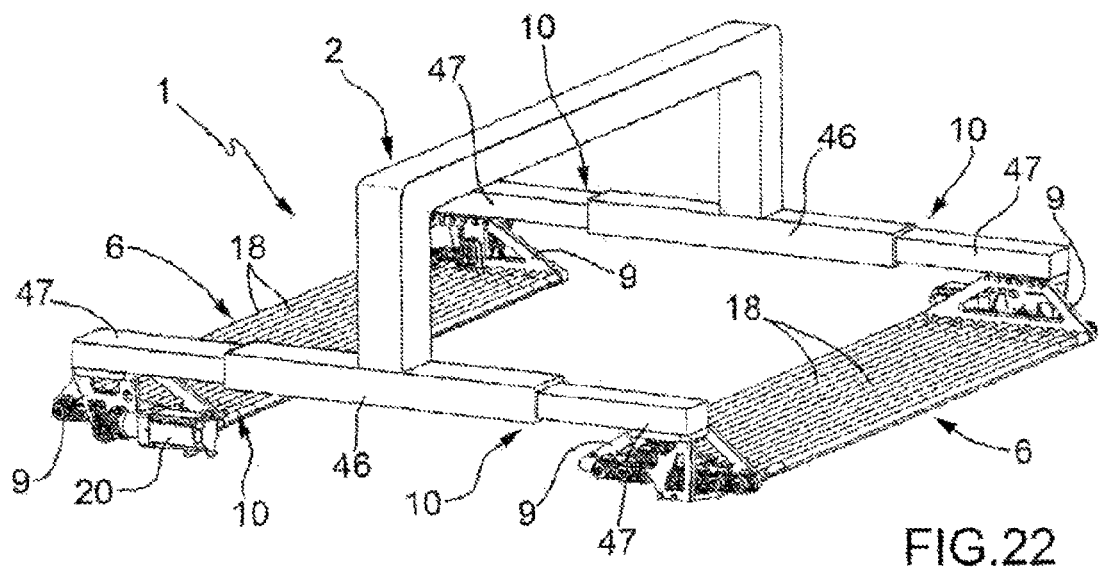
FIG. 22 is an axonometric view of yet another embodiment of the gripping head according to the present invention.

Again another embodiment of the gripping head 1 according to the present invention is schematically illustrated in the axonometric view of FIG. 22.

In this embodiment, the forward movement means 6 are exactly of the same type as those of the embodiment of FIGS. 1-19, i.e. comprising parallel rollers 18.

The gripping head 1 is different however from those of the previous embodiments mainly in terms of the arrangement of the translation means 10.

Indeed, in this embodiment, the translation means 10 are fixed, at each of the gripping elements, directly to the side plates 9.

It is not foreseen for there to be any portal structure to support the forward movement means 6 at each gripping element 4: the construction is therefore lighter and more cost-effective.

More in detail, the gripping head 1 comprises a central support 2 that is substantially portal-shaped, at the ends of which two supports 46 for the translation means 10 are fixed.

The translation means 10 can be of various types and they can be, for example, of the pneumatic or electric type.

It has thus been seen how the invention achieves the proposed purposes.

The present invention has been described according to preferred embodiments, but equivalent variants may be conceived without for this reason departing from the scope of protection offered by the following claims.

The invention claimed is:

1. A gripping head for groups of products comprising a central support, connectable to a robotic arm, and at least two gripping elements associated with said central support on opposite sides, and mobile along a predetermined direction (A) at least from respective open positions to respective closed positions in which they are suitable for lifting the group of products, each of said gripping elements comprising means for advancing the group of products along said predetermined direction (A), wherein at least one of said gripping elements comprises a respective opening that is suitable for allowing the group of products, pulled by said means for advancing, to pass along said predetermined direction (A), wherein said means for advancing of each of said gripping elements comprises a plurality of rollers rotatably supported in said gripping element with axes perpendicular to said predetermined direction (A), and respective means for actuating of the plurality of rollers of the at least two gripping elements.

2. The gripping head according to claim 1, wherein said actuating means of said rollers comprise a geared motor supported by said gripping element and a driving pulley that connects said geared motor to said rollers.

3. The gripping head according to claim 2, wherein said driving pulley is connected to the output shaft of said geared motor, a plurality of driven pulleys each associated with a respective roller, and a plurality of belts that connect said rollers in sets of two.

4. The gripping head according to claim 1, wherein said rollers have a smooth or substantially smooth outer surface.

5. The gripping head according to claim 1, wherein said rollers are made from composite material of the carbon fibre.

6. The gripping head according to claim 1, wherein said means for advancing of each of said gripping elements comprises at least one belt wound on a driving roller and a driven roller rotatably supported in said gripping element with axes perpendicular to said predetermined direction A, and an actuating gear motor connected to said driving roller.

7. The gripping head according to claim 1, wherein each of said gripping elements comprises a portal structure that defines said lateral opening.

8. The gripping head according to claim 1, wherein each of said gripping elements comprises means for translating with respect to said central support, along said predetermined direction (A).

9. The gripping head according to claim 8, wherein said means for translating comprise an appendage of said gripping elements equipped with a sliding shoe along a guide, foreseen in said central support, which extends parallel to said predetermined direction (A).

10. The gripping head according to claim 9, wherein said means for translating comprise an upper geared motor that drives a chain, closed in a loop and engaging with a driving crown and a driven pinion rotatably supported in said central support, said chain having the sliding shoe of both of said gripping elements fixed to it.

11. The gripping head according to claim 1, comprising compacting means associated with said central support and movable at least from respective open positions to respective compacting positions in which they surround the group of products so as to make an optimal ordered configuration.

12. The gripping head according to claim 11, wherein said compacting means are arranged between said gripping elements.

13. The gripping head according to claim 11, wherein said compacting means comprise first opposite mobile walls foreseen at first sides of said central support.

14. The gripping head according to claim 13, wherein said first mobile walls are associated with respective first translation members along a direction perpendicular to said predetermined direction (A).

15. The gripping head according to claim 13, wherein said compacting means comprise second opposite mobile walls foreseen at second sides of said central support.

16. The gripping head according to claim 15, wherein said second mobile walls are associated with respective second translation members along said predetermined direction (A).

17. The gripping head according to claim 16, wherein said second mobile walls are associated with respective rotating means around respective axes parallel to said second sides, wherein said rotating means enable lifting of the second mobile walls so as to allow the group of products to pass.

18. A gripping station for groups of products, comprising a robotic arm (B), a gripping head, according to claim 1 fixed to the robotic arm (B), a pick-up area (R) of the groups of products, and a release area (P) of the groups of products.

19. The gripping station according to claim 18, wherein said pick-up area (R) of groups of products comprises a roller unit.

20. The gripping station according to claim 18, wherein said release area (P) comprises a pallet.

21. A gripping head for groups of products comprising a central support, connectable to a robotic arm, and at least two gripping elements associated with said central support on opposite sides, and mobile along a predetermined direction (A) at least from respective open positions to respective closed positions in which they are suitable for lifting the group of products, each of said gripping elements comprising means for advancing the group of products along said predetermined direction (A), wherein at least one of said gripping elements comprises a respective opening that is suitable for allowing the group of products, pulled by said advancing means, to pass along said predetermined direction (A), wherein said means for advancing of each of said gripping elements comprises at least one belt wound on a driving roller and a driven roller rotatably supported in said gripping element with axes perpendicular to said predetermined direction (A), and an actuating gear motor connected to said driving roller.

* * * * *